Feb. 15, 1966     J. R. HILAND     3,234,737
PRESSURIZING SYSTEM
Filed Dec. 21, 1962     2 Sheets-Sheet 2

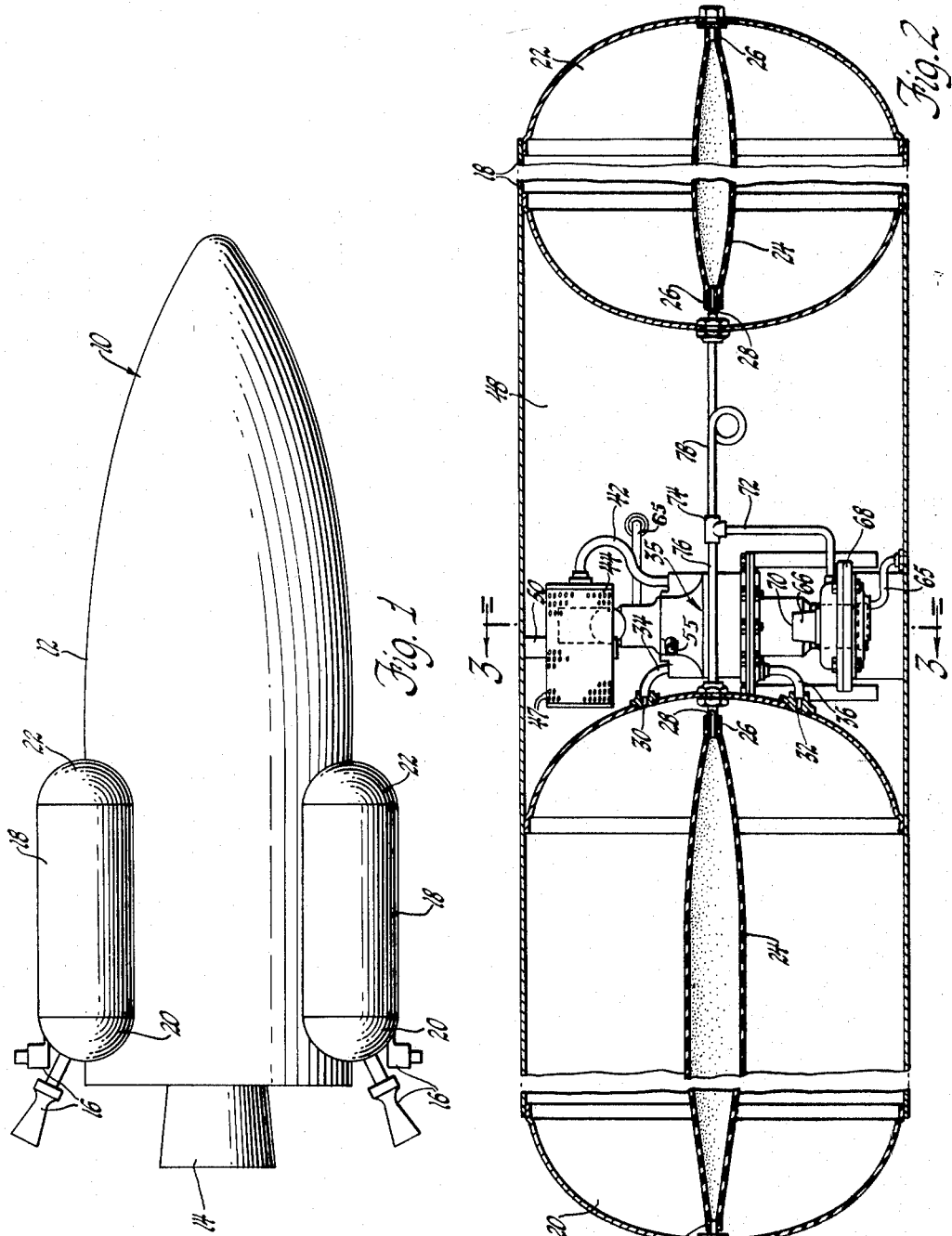

INVENTOR.
John R. Hiland
BY
Paul Fitzpatrick
ATTORNEY

United States Patent Office
3,234,737
Patented Feb. 15, 1966

3,234,737
PRESSURIZING SYSTEM
John R. Hiland, Canoga Park, Calif., assignor to General Motors Corporation, Detroit, Mich., a corporation of Delaware
Filed Dec. 21, 1962, Ser. No. 246,474
1 Claim. (Cl. 60—39.48)

This invention relates to a system and apparatus for pressurizing the fluid in a tank, and more particularly to a system generating a pressurizing gas from the fluid contained in the tank.

In chemical liquid fuel burning rocket engines, or the like, for example, where weight is of primary importance and the fuel and oxidizer must be carried in separate tanks, a problem exists as to how to efficiently pressurize the fuel and oxidizer for delivery into the rocket engine combustion chamber. Having to carry a separate pressurizing gas tank would not solve the problem, since the tank would necessarily be large and weighty, thereby producing additional drag on the engine and lowering its efficiency. Also, it would be impractical to pack a pressurizing apparatus in the tanks themselves because the size of the tanks would necessarily have to be quite large to contain it, adding still more weight and drag to the engine.

This invention eliminates the above disadvantages by providing a fluid pressurizing system wherein the fluid carried in the tank acts as its own pressurizing agent by having a portion thereof combined with a reactant to produce high pressure gas acting against the fluid. A feature of the invention is that once the system is initially pressurized, no outside sources are needed and the system is self-sustaining.

In general, the invention relates to a system and an apparatus for pressurizing the liquid fuel or oxidizer tanks of a liquid propulsion rocket motor so that the fuel and oxidizer are discharged from the tanks at the proper pressure. The system includes a gas generator chemically combining a portion of the liquid fuel or oxidizer with an appropriate solid reactant to produce a gas which is contained in the space within the vehicle shell between the tanks. The gas is fed into a bladder member in each of the tanks to expand it against the fuel and oxidizer, pressurizing them to the desired level. A pressure regulator valve maintains this pressure level in the bladder. If the gas pressure in the space is too low, a pressure responsive device activates a fuel injection system to supply fuel or oxidizer to the generator to generate more gas. Thus, a drop in fuel or oxidizer pressure below the desired operating level causes the gas generator to produce the gas necessary to expand the bladder to raise the pressure of the fuel and oxidizer in the tanks.

Therefore, it is an object of this invention to provide a system and apparatus for pressurizing a fluid in a closed tank.

It is a further object of the invention to provide a fluid tank pressurizing system wherein the fluid carried in the tank acts as its own pressurizing agent.

It is a still further object of the invention to provide a system and apparatus for pressurizing the fuel and oxidizer tanks of a liquid rocket propulsion system, the system chemically combining a portion of the oxidizer or fuel with a solid reactant to product a gaseous product adapted to be discharged into the tanks to act against the fluids therein.

Another object of the invention is to provide a system and apparatus for pressurizing the fuel and oxidizer tanks of a liquid rocket propulsion system wherein no outside pressurizing sources are needed once the system is initially activated.

Other objects, features and advantages of the invention will become apparent upon reference to the succeeding detailed description of the invention and to the drawings illustrating the preferred embodiment thereof; wherein, FIGURE 1 is a schematic illustration of a rocket embodying the invention;

FIGURE 2 is an enlarged cross sectional view of details of FIGURE 1;

Figures 3, 4, 5:
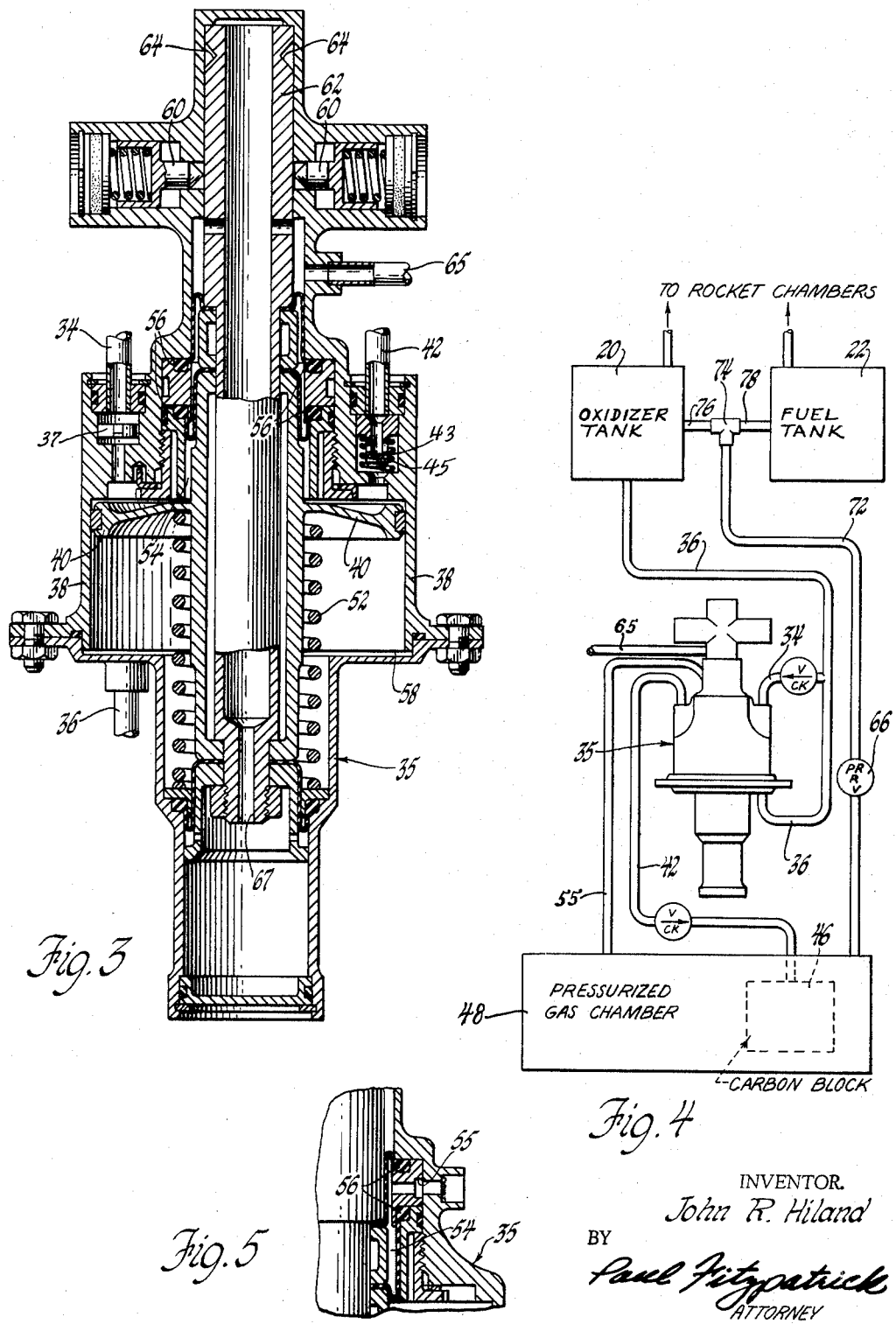
FIGURE 3 is an enlarged cross sectional view of the injection system of FIGURE 2.
FIGURE 4 is a schematic diagram of the pressurizing system.
FIGURE 5 is a sectional view of a detail of FIGURE 3.

More specifically, FIGURE 1 shows the invention installed in a liquid fuel propulsion rocket vehicle 10, having an annular casing 12 and a main rocket exhaust nozzle 14. In this particular installation, the rocket vehicle has four attitude control nozzles 16 intermittently providing side thrust forces about the center of gravity of the missile to maintain it on its scheduled flight path. The fuel for these nozzles is carried in separate identical enclosures 18 secured to the engine, the enclosures each surrounding portions of separated liquid oxidizer and fuel tanks 20 and 22 as shown in FIGURE 2, where one of the identical enclosures 18 is depicted in detail. The main ports and connections for discharging the fuel and oxidizer from the tanks into the nozzle combustion chambers are not shown in FIGURE 2, since the details are immaterial to the understanding of the invention.

Each of the tanks 20 and 22 has a disc shaped expandable means 24 mounted internally of the tank by a suitable type of fitting 26. This expandable means 24 will be either a rubberized bladder or a thin metal corrugated bellows. One of the fittings 26 of each tank has a radial fluid passage 28 through one portion to admit a pressurizing gas to the bladder to expand it against the fuel or oxidizer in the tank. The source of the pressurizing gas and the controls to maintain the bladder pressure at the proper level are as follows.

The oxidizer tank 20 has openings 30 and 32 from which conduits 34 and 36 lead into a fuel injection device 35. The oxidizer is passed through both conduits 34 and 36 into a fuel injection cylinder 38, as seen in FIGURE 3. Residing in the injection cylinder 38 is the injection piston 40. The piston 40 is shown in FIGURE 3 in the forward or injection position. The oxidizer is pushed or injected by the piston member 40 through the conduit 42 to the gas generator 44. The gas generator 44 contains the solid fuel reactant 46 which in this case is a carbon block. The oxidizer and solid fuel reactant combine to form a gaseous product in the gas generator 44. The generated gas then passes out through apertures 47 in the gas generator surface into the chamber 48 formed by the oxidizer tank 20, the fuel tank 22, and the casing 18. The gas generator 44 is held to the casing 18 by a strut 50. The conduit 34 has a one-way check valve 37 at its entrance to the injection cylinder 38 which closes upon the attainment of a predetermined pressure in cylinder 38. The conduit 42 has a valve 43 biased by a spring 45 which opens during injection and closes when the pressure in chamber 48 is greater than that in cylinder 38.

The fuel injection piston 40 is held in the injected position by a spring 52. When the chamber 48 has reached the predetermined pressure desired, the gas is admitted to the cavity 54 through an opening 55 between the seals 56. This pressure then overcomes the force of the spring and pushes the piston member 40 back to its seated position on the cylinder surface 58. The pressure of the gas in cavity 54 acts on both ends of the cavity, but due to the differential area extending around the circumference of the cavity, the larger force occurs at the piston end of the cavity thereby moving the piston to its seated position. When it has reached this position, the spring loaded detents 60 engage notches 64 in the piston shaft 62. The piston member 40 will remain in this position until the pressure in the chamber 48 drops below the value needed to overcome the force of the spring 52. The forces provided by the detent and spring members are calibrated such that the proper gas pressure in the chamber 48 is maintained. A vent 65, leading to an exterior pressure source, is provided to equalize all internal pressure forces around the piston shaft 62 and its housing. This internal equalization of pressure is made feasible by the central passage 67 in the piston shaft 62, as it distributes the pressure to both ends of the shaft and to all internal openings.

The pressure regulator valve 66 is secured within the casing 18 by means of a flange support 68, and may be of any suitable type regulating the supply of gas to the bladders at the desired pressure level. The valve 66 has an inlet portion 70 and an exit conduit 72, which leads to the two-way junction 74. From the two-way connection 74 extend the tank pressurizing lines 76 and 78, which lead into the bladders 24 in the oxidizer tank 20 and the fuel tank 22, respectively.

Although the operation of the entire system is believed to be clear from the above description, it will be summarized briefly. Initially, the tanks 20 and 22 are filled with liquid fuel and oxidizer, substantially collapsing the bladders 24. Then the bladders must be charged with gas from an external source to place the fuel and oxidizer under pressure. This initial charging can be accomplished by tapping into the system at any one of several places, such as conduit 72 so that the pressurizing medium reaches the tanks. Then, since the pressurized gas chamber 48 is at a low pressure, the difference in pressure between the oxidizer tank 20 and the chamber 48 causes oxidizer to flow into the injection chamber 38 and out through the conduit 42 to the gas generator 44 where it reacts with the solid reactant 46 and is discharged as a gas through the apertures 47 in the gas generator 44 to the gas chamber 48. Once the two pressures are equal, the oxidizer will stop flowing to the gas generator. The gas produced then fills the chamber 48 and flows through the regulator valve 66 to increase the pressure in the bladders 24. The valve 66 stops the flow of gas into the bladders 24 when the chamber pressure reaches 200 p.s.i. The gas generator 44 continues to gas until all the oxidizer in the generator is used up thereby raising the pressure in the chamber 48 to a value of 300 p.s.i. This chamber gas flows through inlet 55, which can best be seen in FIGURE 5, and fills the cavity 54 in the injection means and the increased pressure causes the piston members 40 to be returned to the cocked position. When the piston 40 returns to this position, the detents 60 drop into their slots 64 in the piston structure. The chamber 38 in the injection means then is refilled with oxidizer through the conduit 34. The conduit 36 serves only to provide oxidizer to equalize the pressure on the piston. The piston 40 will remain in the cocked position until the pressure in the chamber 48 drops to a value of 220 p.s.i., the spring mechanism 52 overcomes the force of the chamber pressure and the detents 60 and thrusts the piston 40 forward thereby injecting the oxidizer through the conduit 42 into the gas generator 44. This cycle is shown schematically in FIGURE 4. It can be seen that as soon as the pressure in the chamber 48 reaches the value of 260 p.s.i. it will cause the piston 40 to be recocked and the cycle is ready to start over again. From this it is evident that once the system is pressurized by an external source and starts its cycle, it is self-sustaining.

The bladder pressure could drop for a number of reasons; the main one being, of course, the result of supplying fuel and oxidizer to the attitude control nozzles 16. Also, since the liquid oxidizer and fuel are generally cold, the transfer of heat through the bladders from the gas to the oxidizer or fuel may, over a period of time, contract the gas thereby lowering the bladder pressure below 200 p.s.i. A further reason for pressure drop may be leakage. In any case, the pressure loss in the bladders is made up by the supply of higher pressure gas through the regulator valve from the gas chamber. Therefore, it will be seen that this invention provides a self-sustaining fluid pressurizing system that utilizes the fluid in the tanks as a pressurizing agent to automatically maintain the fluid at a constant pressure level in the tanks.

While a liquid oxidizer and a solid reactant such as carbon have been described as the chemical components for producing the gas pressurizing agent, it will be clear that other components could be used without departing from the scope of the invention; such as, for example, combining the fuel with a solid oxidizer. Also, while the invention has been illustrated in connection with a rocket engine, it will be clear to those skilled in the arts to which the invention pertains that it would have uses in many installations other than that shown where an apparatus for pressurizing the fluid in a tank is desired and that many changes and modifications may be made thereto without departing from the scope of the invention.

I claim:

A propellant tank pressurizing system comprising, in combination, a propellant tank filled with a propellant, a hollow casing surrounding one end of the propellant tank forming a closed fluid chamber therebetween, a gas generator in the chamber containing a reactant producing a gas when combined with the propellant, the generator having a propellant inlet and a gas outlet opening into the chamber, conduit means connecting the propellant in the tank to the said inlet of the gas generator, propellant injection means in the conduit means, gas pressure responsive actuating means in the injection means, the tank having an expandable closed gas compartment therein, means connected to the expandable compartment and chamber for communicating the gas in the chamber to the compartment, the compartment comprising a bladder member, said pressure responsive means being operable below a predetermined chamber gas pressure to effect actuation of the actuation means to drive the injection means and deliver propellant to the gas generator, the generator discharging gas into the chamber and into the compartment to expand the compartment thereby raising the pressure of the propellant in the tank, said injection means comprising an injection cylinder, a piston which traverses the length of the injection cylinder, a spring member which actuates the piston upon a drop in the chamber pressure below a predetermined level, a detent means to hold the piston and spring in the compressed position when chamber pressure is sufficient to deactivate the injection means and terminate the supply of propellant to the generator, the pressure responsive means being connected to the compartment and chamber and including pressure regulating means having an inlet connected to the gas in the chamber and an outlet connected to the compartment means and being responsive to a predetermined gas pressure in the expandable compartment means to terminate the flow of gas thereto.

References Cited by the Examiner

UNITED STATES PATENTS

| | | |
|---|---|---|
| 2,394,852 | 2/1946 | Goddard. |
| 2,688,514 | 9/1954 | Oishei, et al. _____ 103—48 X |
| 3,064,902 | 11/1962 | Moore et al. _____ 158—50.1 X |
| 3,104,526 | 9/1963 | Hirschfeld et al. ___ 158—50.1 X |

FREDERICK L. MATTESON, Jr., *Primary Examiner.*

FREDERICK KETTERER, JAMES W. WESTHAVER, *Examiners.*